United States Patent [19]

Soderberg et al.

[11] Patent Number: 4,528,644

[45] Date of Patent: Jul. 9, 1985

[54] CUSTOMIZING THE FIRMWARE AFTER ASSEMBLY OF AN ELECTRONIC POSTAGE METER

[75] Inventors: John H. Soderberg, Stratford; Edward C. Duwel, Trumbull, both of Conn.

[73] Assignee: Pitney Bowes Inc., Stamford, Conn.

[21] Appl. No.: 515,071

[22] Filed: Jul. 18, 1983

[51] Int. Cl.[3] .............................................. G06F 15/20

[52] U.S. Cl. .................................................... 364/900

[58] Field of Search ......... 364/200, 300, 900 MS File

[56] References Cited

U.S. PATENT DOCUMENTS 4,424,573 1/1984 Eckert, Jr. et al. ................ 364/900

FOREIGN PATENT DOCUMENTS

0019515A2 11/1980 European Pat. Off. .

*Primary Examiner*—Raulfe B. Zache

*Attorney, Agent, or Firm*—Joseph A. Sawyer, Jr.; William D. Soltow, Jr.; Albert W. Scribner

[57] ABSTRACT

A method and associated apparatus for customizing the firmware of an electronic postage meter after assembly, comprising the steps of storing a configuration program within the electronic postage meter which program is capable of configuring the meter in response to configuration input messages, inputting configuration messages into the electronic postage meter to select desired meter functions and provide input data for use with operating programs stored in the meter, storing the configuration input data in the assembled meter under control of the meter configuration program for subsequent interaction with the operating programs of the meter to provide predetermined meter functions, and denying further access to the configuration program prior to placing the meter in service.

41 Claims, 8 Drawing Figures

CUSTOMIZING THE FIRMWARE AFTER ASSEMBLY OF AN ELECTRONIC POSTAGE METER

CROSS REFERENCE TO RELATED APPLICATIONS

The present application is related to copending application Ser. No. 447,815, filed on Dec. 8, 1982, in the name of Danilo Buan and Alton B. Eckert entitled STAND-ALONE ELECTRONIC MAILING MACHINE, which describes one type of electronic postage meter within which the present invention may be utilized, and copending application Ser. No. 447,912, filed on Dec. 8, 1982 in the names of John H. Soderberg and Edward C. Duwel, entitled, MODIFYING A FIRMWARE VARIABLE IN AN ELECTRONIC POSTAGE METER, and Ser. No. 447,925, filed on Dec. 8, 1982, in the names of John H. Soderberg and Edward C. Duwel, entitled, CONTROLLING FIRMWARE BRANCH POINTS IN AN ELECTRONIC POSTAGE METER.

BACKGROUND OF THE INVENTION

The present invention relates to electronic postage meters and more particularly to electronic postage meters operating under control of a program and including non-volatile memories (NVMs), of the type such as disclosed in the aforementioned related patent applications.

Known electronic postage meters employing firmware such as disclosed in U.S. Pat. No. 4,301,507, issued on Nov. 17, 1981, and assigned to Pitney Bowes, Inc. of Stamford, Conn. are programmed via ROMs to undergo a certain sequence of operations. In dealing with a single postal system such as that in the United States, one set of software is programmed into the meter. However, when an electronic postage meter is used with a number of different postal systems, i.e., internationally, where the requirements of the postal systems of various countries vary widely, a number of different individual programs or software packages are required to accommodate the variations between the individual countries. Such a multiplicity of software packages greatly increases the cost of the meter. The aforementioned related copending patent application, entitled, CONTROLLING FIRMWARE BRANCH POINTS IN AN ELECTRONIC POSTAGE METER, discloses one way in which a number of individually tailored software packages may be reduced by setting certain data bits in non-volatile memory (NVM) to control firmware branch points. Further, aforementioned related copending patent application, entitled, MODIFYING A FIRMWARE VARIABLE IN AN ELECTRONIC POSTAGE METER, discloses a further technique for reducing the number of individually tailored software packages by setting certain data bits in NVM to modify a firmware variable in ROM.

SUMMARY OF THE INVENTION

It is an object of the present invention to provide a customized electronic postage meter in which program variations are minimized.

It is an object of the present invention to provide customization of an electronic postage meter after final assembly thereof.

It is a still further object of the present invention to provide an electronic postage meter which is capable of employing generalized firmware for use with different postal systems.

It is a still further object of the present invention to provide a firmware controlled international electronic postage meter in which programming costs are minimized.

Briefly, in accordance with the present invention, a method and apparatus is provided for cutomizing the firmware of an electronic postage meter after assembly, comprising the steps of storing a configuration program within the electronic postage meter which program is capable of configuring the meter in response to configuration input messages, inputting configuration messages into the electronic postage meter to select the desired meter functions and provide data for use with operating programs stored in the meter, storing the configuration input data in the assembled meter under control of the meter configuration program for subsequent interaction with the operating programs of the meter to provide predetermined meter functions, and denying further access to the configuration program prior to placing the meter in service.

Other objects, aspects and advantages of the present invention will be apparent from the detailed description considered in conjunction with the preferred embodiment of the invention illustrated in the drawings, as follows:

DETAILED DESCRIPTION

Figure 1:
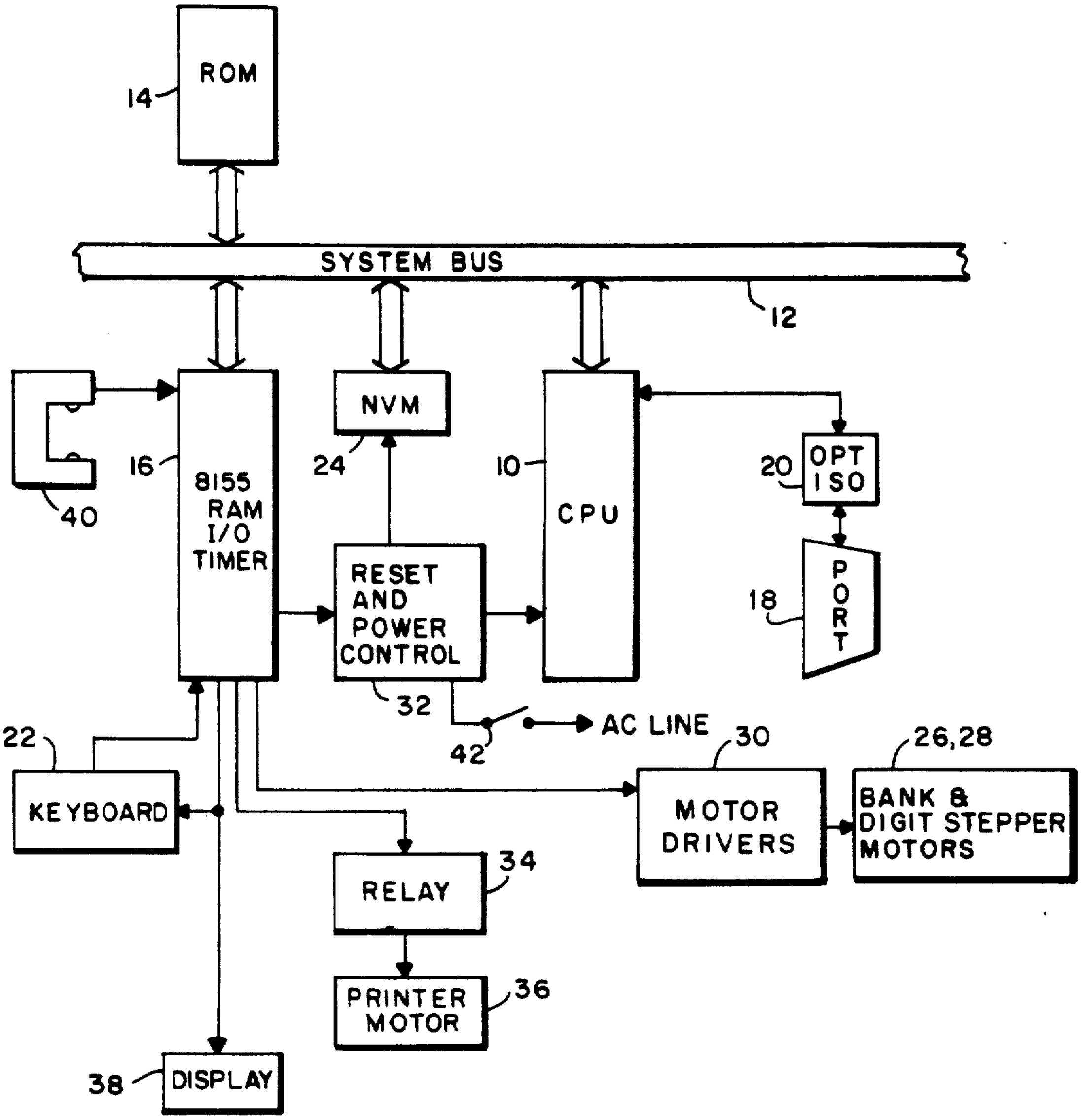
FIG. 1 is a block diagram of the generalized electronic circuit for a stand-alone electronic postage meter of the type with which the present invention may be utilized.

Referring to FIG. 1, the electronic postage meter includes an 8-bit microprocessor 10 (CPU), such as an Intel Model 8085A microprocessor which is connected to various components through a system bus 12. ROM 14 is connected to the microprocessor 10 through the system bus 12. The ROM 14 stores the operating programs for controlling the postage meter. It should be understood that the term ROM as used herein includes permanently programmed and reprogrammable devices. An integrated circuit 16, which may be Intel Model 8155, is connected to the system bus 12 and includes RAM, input and output lines and a timer. The RAM portion of the intergrated circuit 16 has memory space allocated for transient storage of the data such as the ascending register and descending register. An external data communication port 18 is connected to the microprocessor 10 through optical isolator 20. The external data communication port 18 allows connection with devices such as an electronic scale, an external computer, servicing equipment and the like. Also electrically connected to the microprocessor 10 through the system bus 12 is the keyboard 22 of the postage meter and a non-volatile memory (NVM) 24. Stepper motors 26, 28 are also in electrical connection with the microprocessor 10 via motor drivers 30 and the integrated circuit 16. A reset and power control 32 is electrically connected between the integrated circuit 16, the NVM 24 and microprocessor 10. A relay 34 connects the AC printer motor 36 to the integrated circuit 16. A display 38 is also electrically connected to the integrated circuit 16. Trip photosensor 40 is connected to the microprocessor 10 through integrated circuit 16 to indicate the presence of an evelope to be stamped, as described more fully in the aforementioned patent application entitled, STAND-ALONE ELECTRONIC MAILING MACHINE.

The electronic postage meter is controlled by the microprocessor 10 operating under control of the programs stored in the ROM 14. The microprocessor 10 accepts information entered via the keyboard 22 or via the external communication port 18 from external message generators. Critical accounting data and other important information is stored in the non-volatile memory 24. The non-volatile memory 24 may be an MNOS semiconductor type memory, a battery augmented CMOS memory, core memory, or other suitable non-volatile memory component. The non-volatile memory 24 stores critical postage meter data during periods when power is not applied to the postage meter. This data includes in addition to the serial number of the mailing machine or postage meter information as to the value in the descending register (the amount of postage available for printihg), the value in the ascending register (the total amount of postage printed by the meter), and the value in the piece count register (the total number of cyles the meter has performed), as well as other types of data, such as trip status, initialization and service information, all of which are desired to be retained in the memory even though no power is applied to the meter.

When an on/off power switch 42 is turned on (closed) a power supply internal to the mailing machine energizes the microprocessor 10 and the balance of the electronic components. The information stored in the non-volatile memory 24 is transferred via the microprocessor 10 to the RAM of the integrated circuit 16. After power up the RAM contains an image or copy of the information stored in the non-volatile memory 24 prior to energization. During operation of the postage meter, certain of the data in the RAM is modified. Accordingly, when postage is printed, the descending register will be reduced by the value of the printed postage, the ascending register increased by the value of the printed postage and the piece counter register incremented. When the power switch 42 is turned off (opened), the updated data in the RAM is transferred via the microprocessor 10 back into a suitably prepared area of the non-volatile memory 24. A like transfer of information between the non-volatile memory 24 and the RAM takes place during power failure.

Figure 2A:
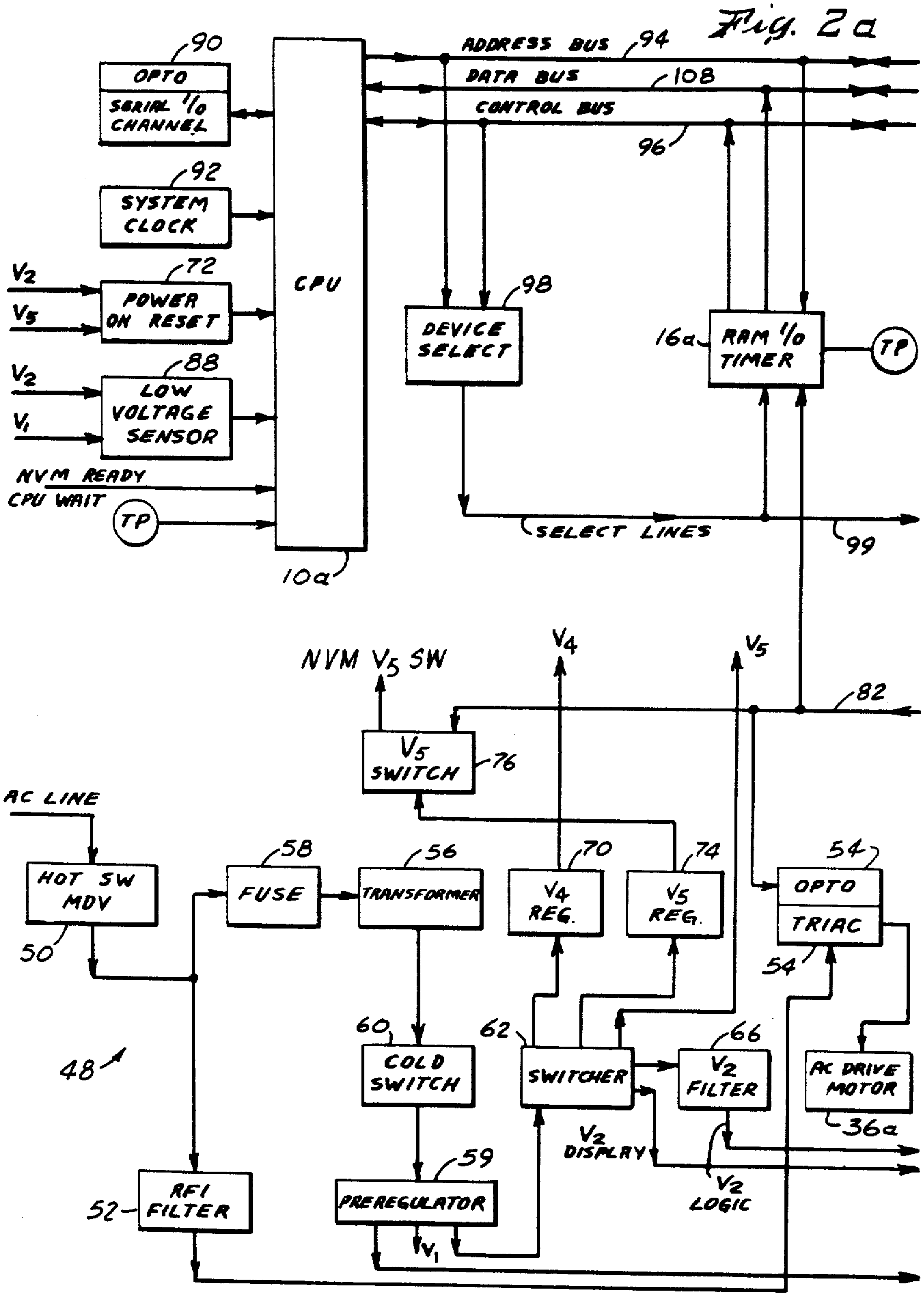
FIGS. 2*a* and 2*b* are a detailed block diagram of the electronic circuitry for a stand-alone electronic postage meter of the type with which the present invention may be utilized.
Figure 2B:
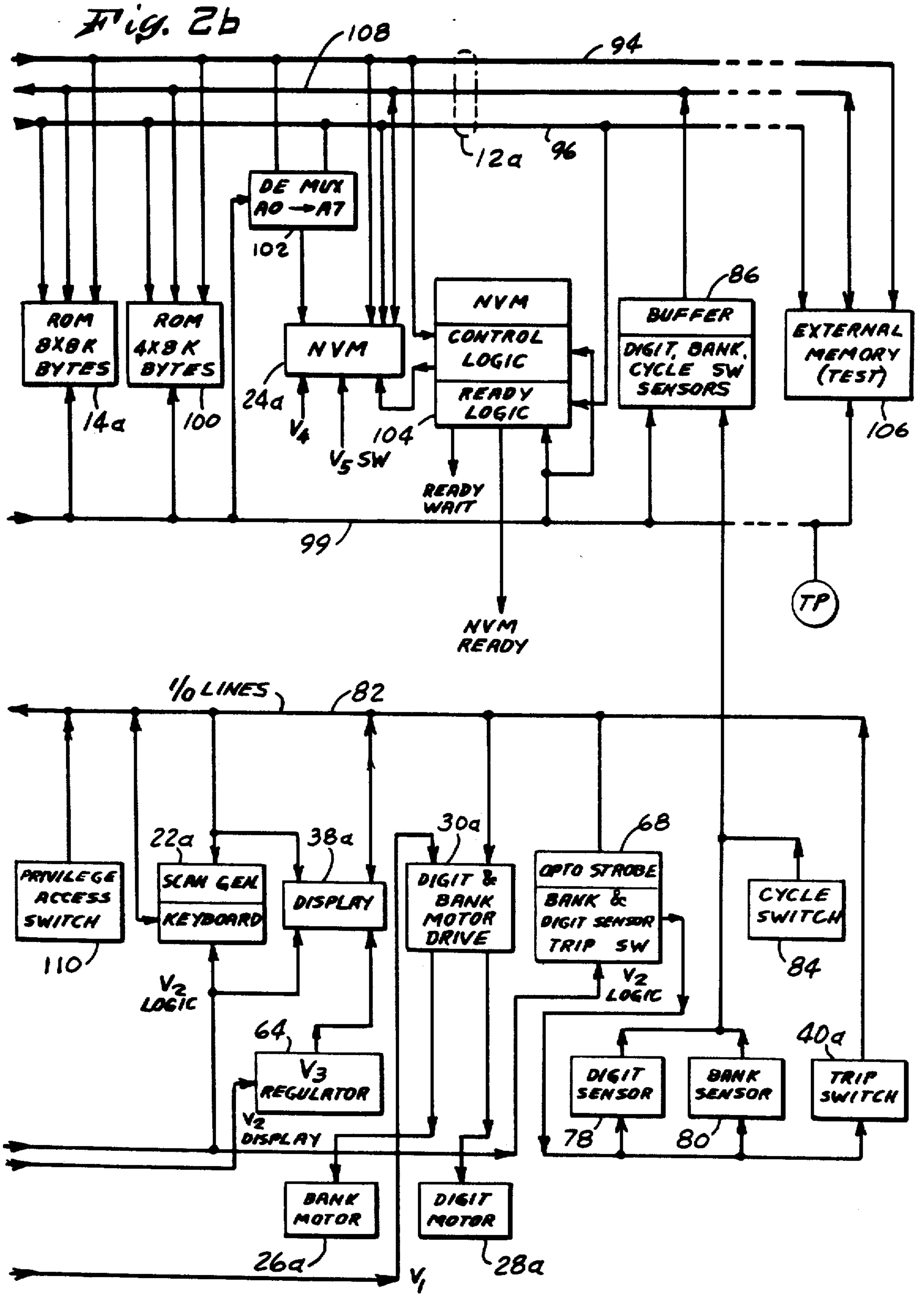

Referring to FIG. 2, a more detailed block diagram of the arrangement of the electrical components for the postage meter is illustrated generally as 48. Power is supplied to the postage meter from the AC line voltage, typically 115 volts. This line voltage is applied to the meter through a hot switch 50 which cuts off power to the postage meter to protect the electrical components thereof if the temperature rises above a preset limit, nominally 70° C. The hot switch 50 is connected to the AC drive motor 36A through an RF filter 52 and an opto-triac 54 which provides isolation between the line voltage and the control logic for the meter. The hot switch 50 is also connected to a transformer 56 protected by a fuse 58. The output of the transformer 56 is coupled to a pre-regulator 59 through a cold switch 60. The cold switch 60 cuts off power to the pre-regulator 59 if the temperature drops below a preset limit, nominally 0° C. The pre-regulator 59 provides an output voltage of a predetermined range to a switcher 62 which generates the output voltage +5 V; and the voltages for generating −12 V and −30 V.

The +5 V is applied to a +3 volt regulator 64 and then to the display 38A. The +5 V from the switcher 62 is also applied to a +5 V filter 66 which provides +5 V for logic circuits. Specifically, the +5 V is applied to the keyboard 22A, the display 38A, and bank, digit and trip sensor logic 68 and to the integrated circuits. The −12 V is applied to a −12 V regulator 70 and then to the non-volatile memory 24A.

The 30 V output from the switcher 62 is also applied to a −30 V regulator 74 and then to a −30 V switch 76 which switches its output voltage on and off in response to the requirements of writing in NVM as dictated by the program. The output of the −30 V switch is applied to the non-volatile memory 24A. The −30 V supply is connected to the power on reset 72 of the microprocessor 10A.

+5 V from the switcher 62 is also supplied to one input of the power on reset 72; the other input receives −30 V from the regulator 74 as previously described. A low voltage sensor 88 also receives one input of +5 V from the switcher 62 and its other input from the pre-regulator 59; its output is applied to the microprocessor 10A. The low voltage sensor 88 detects power failure and communicates this to the microprocessor 10A which in turn addresses the RAM through system bus 12A to transfer all security data present in the RAM to the non-volatile memory 24A.

Another output from the pre-regulator 59 in the form of +24 V is applied to the digit and bank motor drive 30A for the bank motor 26A and digit motor 28A, which selects the particular printing wheel (bank) which is to be activated and the particular digit of the selected printing wheel which is to be set.

An output strobe from the integrated circuit 16A is buffered through buffer driver 68 and applied to digit sensor (encoder) 78, bank sensor (encoder) 80, and trip sensor 40A. The opto strobe applies power to the digit sensor 78, bank sensor 80 and trip sensor 40A when needed. The output from the trip sensor 40A is applied to the input/output lines 82 which are coupled to the integrated circuit 16A. The outputs from the digit sensor 78 and bank sensor 80 and cycle switch 84 are applied to a storage buffer 86.

During power up, the key switch 42, see FIG. 1, is closed, and the AC line voltage energizes the electrical components previously described and an Initialization process will occur. Such initialization may include a hard and/or soft initialization process as disclosed in the aforementioned U.S. Pat. No. 4,301,507. Preferably the Initialization process is that described in copending application Ser. No. 447,913, filed on Dec. 8, 1982, in the names of Alton B. Eckert and Easwaran C. N. Nambudiri entitled, INITIALIZING THE PRINT WHEELS IN AN ELECTRONIC POSTAGE METER, and assigned to the same assignee as the present invention.

In operation, the microprocessor 10A under control of the ROM 14A and possibly the auxiliary ROM 100 communicates over the address bus 94 and control bus 98 with the device select 98. The output of the device select 98 communicates with the particular module to be addressed over select lines 99. The modules to be addressed are the RAM, the ROM 14A, an auxiliary ROM 100, a demultiplexer 102, NVM logic 104 and the buffer 86. The RAM of integrated circuit 16A provides the working memory for the postage meter and auxiliary ROM 100 may be used to provide additional program storage space. The non-volatile memory 24A provides storage of all security information for the meter and retains such information during power down or power failure. The demultiplexer 102 latches the lower eight (8) bits of address information that defines a particular location which is used immediately thereafter. The NVM logic 104 controls the mode of operation of the NVM 24A and also provides ready wait and NVM ready signals to the microprocessor 10A to indicate the presence of the slow speed device (NVM) as active on the bus 12A.

As previously mentioned, the digital sensor 78 (optical encoder) and bank sensor 80, (optical encoder) and cycle switch 84 whose current state is read, i.e., "Home" or "In Cycle", apply input signals to the storage latch 86 which sends output signals over data bus 108 to the microprocessor 10A for storage in the proper RAM location.

The RAM is also electrically coupled to I/O lines to transmit or receive data from the trip sensor 40A, the display 38A, keyboard 22A, and privilege access switch 110, if present. The privilege access switch 110 may be used in applications which require manual resetting of meter postage via a switch which is kept under seal.

The NVM 24A is assembled in the postage meter, with certain data bits set therein and the ROMs 14A and 100 are assembled into the meter with the operating programs for the meter and a program to customize or configure the meter coded therein. The final postage meter configuration is determined by input configuration data received from an external device, e.g., an external port 18 or from the keyboard 22. The microprocessor 16A operating under control of the program for customizing the meter writes the input configuration data in the proper address of the NVM 24A for subsequent interaction with the meter operating programs. This input data may represent the intitial data entered into a specific address in the NVM 24A or it may modify certain data already stored in the NVM 24A, as desired.

After all the input configuration data has been entered in the NVM 24A and prior to placing the meter in service, a special message is inputted to the microprocessor 16A to prevent any further operation of the meter configuration program. The format of the special message is preferably of the type disclosed in pending patent application Ser. No. 447,919, filed on Dec. 8, 1982, in the names of John H. Soderberg et al., entitled, POSTAGE METER WITH KEYBOARD KEYS FOR CAUSING DISPLAY OF DATA PERTAINING TO METER OPERATION and pending patent application Ser. No. 447,861, filed on Dec. 8, 1982, in the names of John H. Soderberg et al., entitled, POSTAGE METER WITH KEYBOARD KEYS FOR CAUSING METER OPERATIONS TO BE PERFORMED.

Advantageously, the special message may activate a program which locks out further operation of the meter configuration program. Such an arrangement is disclosed in copending patent application Ser. No. 397,398, filed on July 12, 1982, in the names of Raymond R. Crowley and John H. Soderberg, entitled, ELECTRONIC POSTAGE METER HAVING A ONE TIME ACTUABLE OPERATING PROGRAM TO ENABLE SETTING OF CRITICAL ACCOUNTING REGISTERES TO PREDETERMINED VALUES. Advantageously, the serial number lock entered in the NVM 24A can itself be the lock out message. Such an arrangement is disclosed in copending patent application Ser. No. 355,437, filed on Mar. 8, 1982, in the names of Edward C. Duwel and John H. Soderberg, entitled, NON-VOLATILE MEMORY SERIAL NUMBER LOCK FOR ELECTRONIC POSTAGE METER.

As disclosed in the aforementioned patent applications entitled, ELECTRONIC POSTAGE METER HAVING A ONE TIME OPERATING PROGRAM TO ENABLE SETTING CRITICAL ACCOUNTING REGISTERS TO PREDETERMINED VALUE, and NON-VOLATILE MEMORY SERIAL NUMBER LOCK FOR ELECTRONIC POSTAGE METER, an external message generator (not shown) may be coupled to port 18 of FIG. 1 to enable the generation of a particular message. The format of the message is described in these two aforementioned patent applications, Ser. No. 347,398 and Ser. No. 355,437.

Contained in the non-volatile memory of the meter are seven nibbles which are reserved for the serial number. Also contained in non-volatile memory is an additional bit position which is reserved for the lock indicator. The placement of the serial number is indicated by the indicators of the binary coded digit, where BCD 7 is the most significant digit of the serial number and BCD 1 is the least significant digit.

Each serial number message consists of a one byte (eight bits) header or identifier, a format byte, and four data bytes for a toal of six bytes. Contained in the four data bytes is a BCD operational indicator followed by seven binary coded digits, two per byte, representing the serial number. The lock message may be implemented by the serial number message. The header format and data bytes are as generally described in U.S. Pat. No. 4,301,507 issued to John H. Soderberg et al. on Nov. 17, 1981 entitled, ELECTRONIC POSTAGE METER HAVING PLURAL COMPUTING SYSTEMS, and pending patent application Ser. No. 447,901, filed on Dec. 8, 1982, in the name of John H. Soderberg et al., entitled, POSTAGE METER WITH KEYBOARD KEYS FOR COMMANDING AND REQUESTING PERFORMANCE OF METER OPERATIONS. The header provides identification of the unique message that is to follow, here, the fact that the message constitutes configuration data or the serial number. The format byte contains two BCD digits indicating the number of data digits to follow and the placement of the decimal point within these digits. With a serial number, there is no decimal point, therefore, the decimal point position indicator will be shown as containing four ones or a hex F in the decimal point indicator position.

The operational indicator BCD digit indicates to the meter operating under the control of the firmware program contained in the ROM which operation, i.e., entry of configuration data in this case or a configuration serial number lock, is to be performed. Regarding the BCD configuration digit, a zero will indicate a change and a one, to lock.

The meter is placed in the service mode, e.g., by transmission of an external message from an external message generator (not shown) via port 18, or by inputting a message through the keyboard 22. For a further description of the service mode reference should be made to the aforementioned patent applications entitled, POSTAGE METER WITH KEYBOARD KEYS FOR COMMANDING AND REQUESTING PERFORMANCE OF METERS OPERATIONS, POSTAGE METER WITH KEYBOARD KEYS FOR CAUSING DISPLAY OF DATA PERTAINING TO METER OPERATION, and POSTAGE METER WITH KEYBOARD KEYS FOR CAUSING METER OPERATIONS TO BE PERFORMED.

Figure 3:
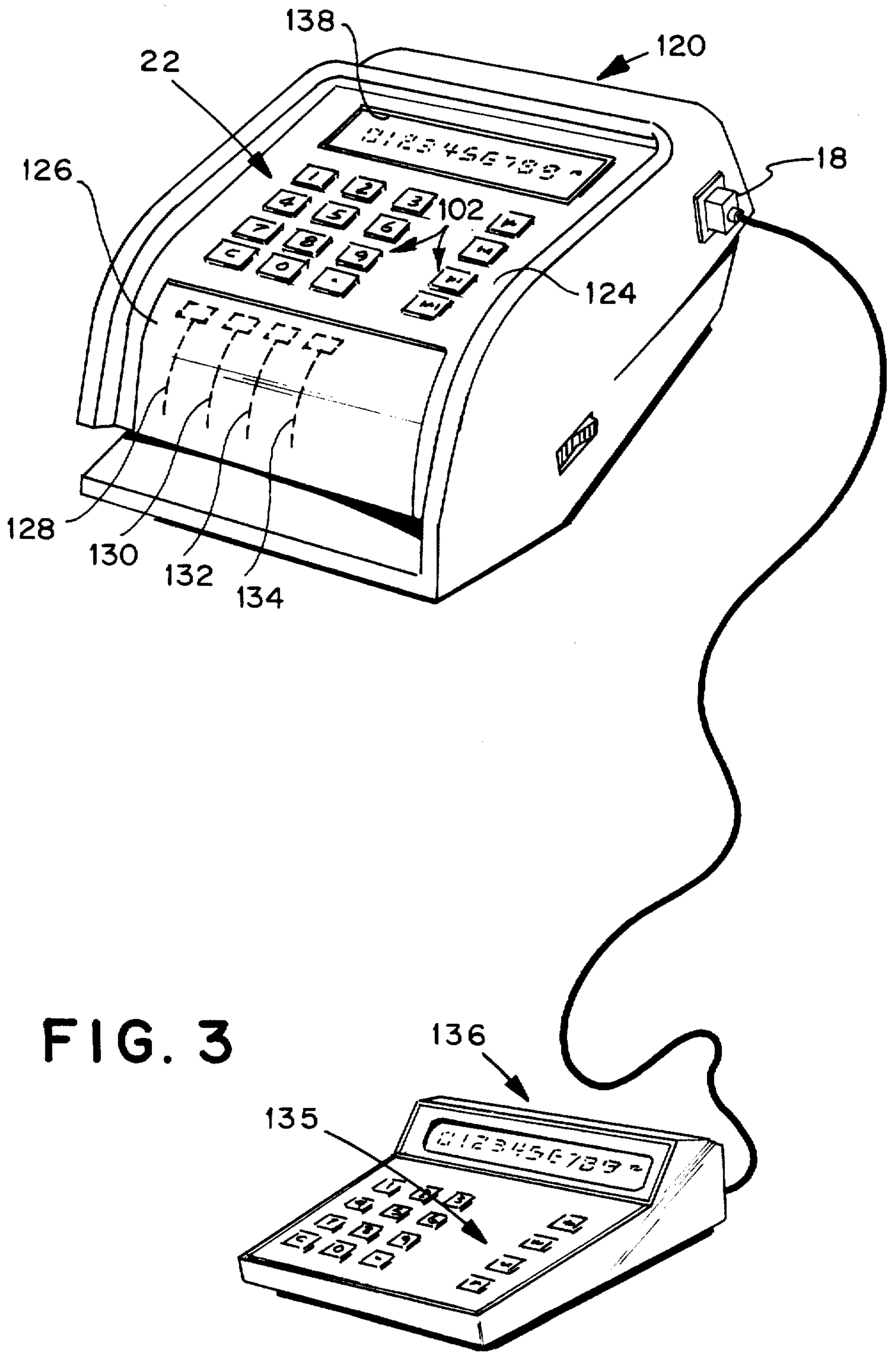
FIG. 3 is a perspective view of one form of electronic postage meter in which the present invention may be utilized.

Referring to FIG. 3, an electronic mailing machine is illustrated as 120. The keyboard 22 includes a plurality of keys 122 which extend through openings in the meter housing 124 for access for an operator. Such keys 122 include numeric setting keys numbered 0 through 9, a clear key, a decimal key, a postage used key, a postage unused key, a piece count key and a select postage key. In addition, located under a movable lid 126 of the meter housing 124 are a plurality of special purpose keys of the keyboard 22. Such keys include an access code key 123, an enter amount key 130, an enter combination key 132, and a check date key 134. Similar keys 135 may be provided in an extermal signal generator 136 coupled to port 18. Entered and retrieved information is displayed on the LED display 138.

In the aforementioned patent application, entitled, POSTAGE METER WITH KEYBOARD KEYS FOR COMMANDING AND REQUESTING PERFORMANCE OF METER OPERATIONS, various functions are described during the service mode. Entering the service mode from the keyboard 22 may be accomplished by a predetermined numerical code, including preferably four characters, which is entered by depressing the appropriate numerical keys, followed by depression of the access code key 128 which invokes a control routine which generates a request or command header corresponding to the two low order digits. For example, entering the numerals 6946 in the keyboard 22 followed by depression of the access code key 128 will cause the generation of a "46" command header. A conventional subroutine is then entered causing the meter to enter the service mode of operation. This may also be accomplished by inputting the "46" command header from the external signal generator 136.

The flowcharts discussed below indicate how input data received from an external device, e.g., an external channel such as port 18 or the keyboard 22, can be used by a stored configuration program to customize the operating software (firmware) stored in one or more ROMs 14A and 100.

Figure 4A:
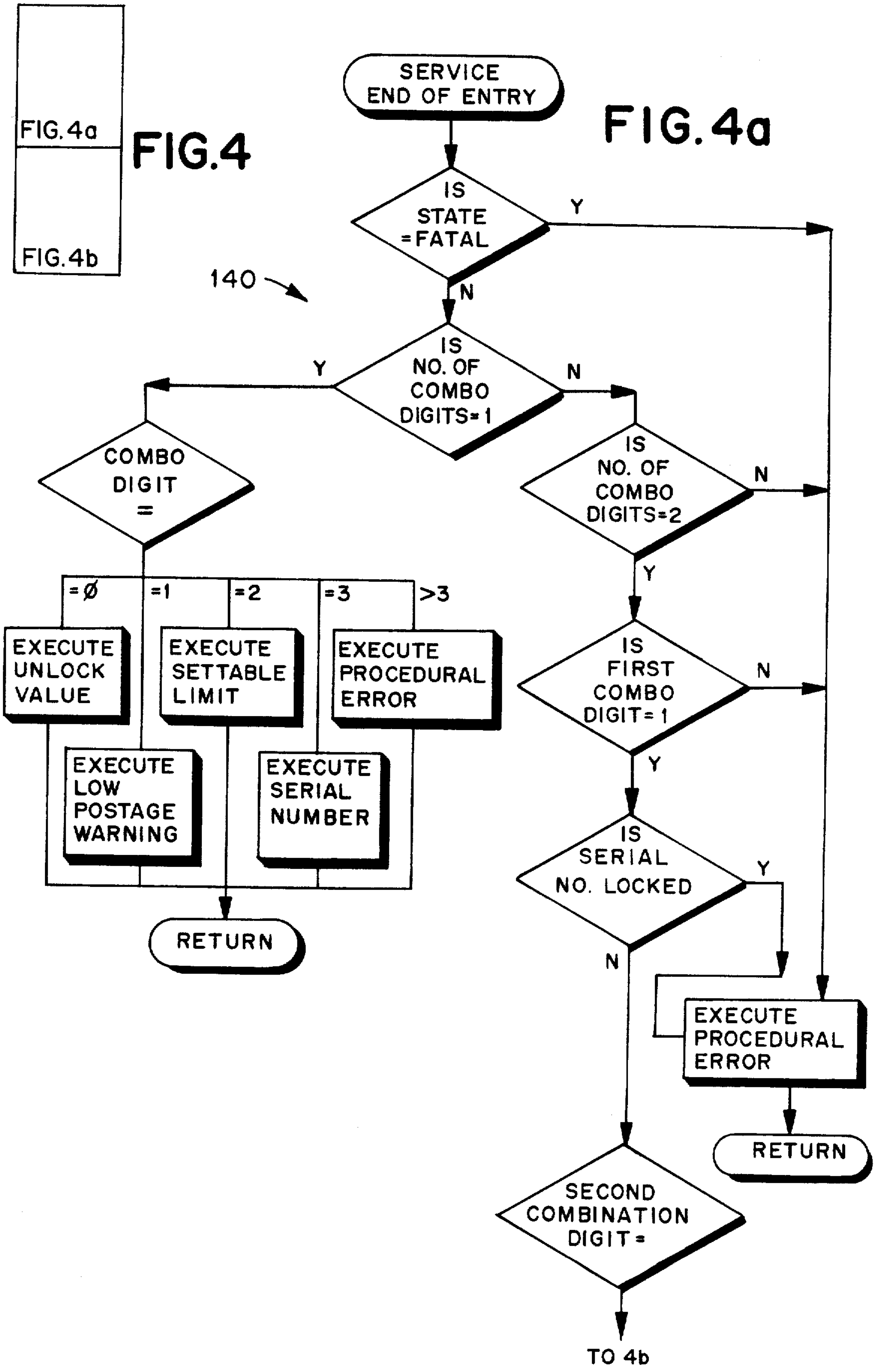
FIGS. 4*a* and 4*b* are a flowchart of a program for customizing the firmware.
Figure 4B:
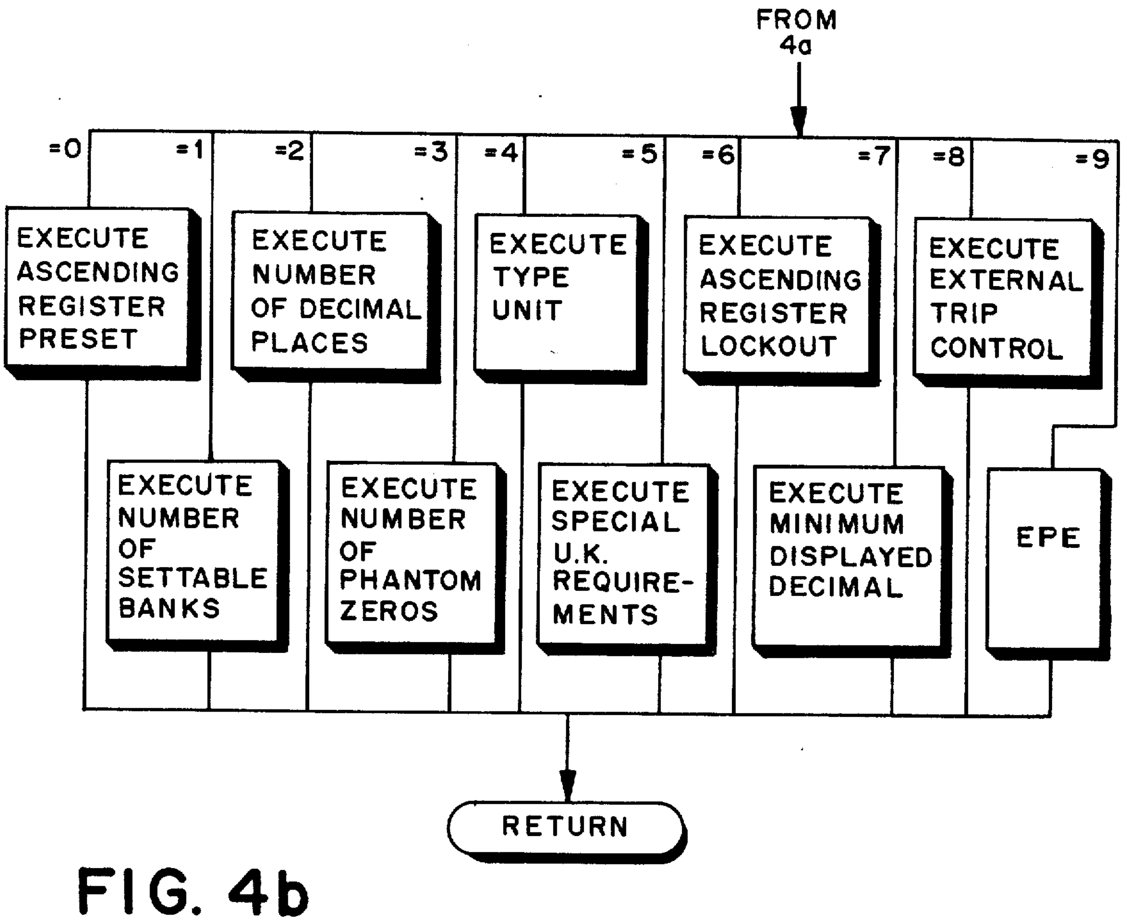

Referring to the flowchart designated as 140 in FIG. 4, during the service end of entry routine the state of the meter is checked to determine if it is fatal. If so, a procedural error is executed and control is returned to the superordinate process. If the state of the meter is not fatal, it is first determined if only one (1) combination digit was entered. If so, a subroutine is entered in accordance with the value of the digit to execute the unlock value (value 0), execute low postage warning (value 1), execute settable limit (value 2), execute serial number, i.e., serial number lock out (value 3), and execute procedural error (value greater than 3).

However, if the number of combination digits entered is not equal to one (1), a subroutine to configure the meter to accomplish predetermined functions is entered. First it is determined whether the number of combination digits equals two (2). If not, a procedural error is executed and control is returned to the superordinate process. If the number of combination digits does equal two (2), the subroutine proceeds. It is then determined if the first combination digit equals (1). If not, a procedural error is executed, as previously described. If it does equal one (1), the serial number lock address is checked to see if the serial number is locked. If so, a procedural error is executed. If not, the subroutine proceeds to determine the value of the second combination digit. If the value of the second combination digit is 0, the ascending register preset value is modified in accordance with the data contained in the message. If the value is 1, the number of settable banks is set. If the value is 2, the number of decimal places is set. If the value is 2, the number of phantom zeros is set. If the value is 4, the type of unit is set, e.g., Current Account, VRMRS or Manual Reset. If the value is 5, the meter is set for special requirements of the United Kingdom, such as half pence. If the value is 6, the ascending register lock out value is set. If the value is 7, the minimum decimal to be displayed is set. If the value is 8, external trip control is enabled so that the meter can be tripped externally. If the value is 9, a procedural error is executed. However, it should be understood that these values may vary as desired. The numbers 1 through 9 were used for illustrative purposes and the values can be any unique number as desired. Upon completion of the aforementioned functions, control is returned to the superordinate process. Prior to entering the service end of entry routine two messages are entered; the first message is an enter combination message which defines the function and the second message is an enter amount message which supplies the data. That is, pairs of messages are entered to define the function and data therefore. However, it should be understood that such pairs of messages can also be entered from the external channel by an external signal generator 136, as described in aforementioned U.S. Pat. No. 4,301,507.

The nine (9) functions illustrated in FIG. 4 are illustrated separately for clarity and to facilitate description thereof. However, it should be understood that a plurality of these functions can be combined into sets so that a unique single digit or plurality of digits may be used to address a given set of functions. Further, other functions may also be accomplished by this subroutine, as desired.

It should be appreciated from the foregoing description and the flowchart of FIG. 4, that code is written into the ROM (firmware) that enables data to be modified or entered in NVM in response to entry of the proper header. This can be accomplished by accessing this code through the keyboard 22 or an external interface 136. Thus, final customization can advantageously be accomplished during final assembly and prior to placing the meter in service, which may take place at a remote location, enabling the meter to be fully assembled with one universal software package coded therein.

If a message is entered from the keyboard, an end of entry message is automatically generated. However, if a message is entered from the external signal generator 136 an end of entry message must also be entered. In either case, a one byte message is used to retrieve and verify the entered information.

After the configuration data is entered and verified, the serial number is entered and subsequently locked to prevent further access to the configuration program or code in ROM that permits a change in the NVM. However, the retrieval of information for checking the status of a function is not prevented by the serial number lock entry. Further, the retrieval of information may be on a one-for-one basis or fields of information may be retrieved, as desired.

Figure 5:
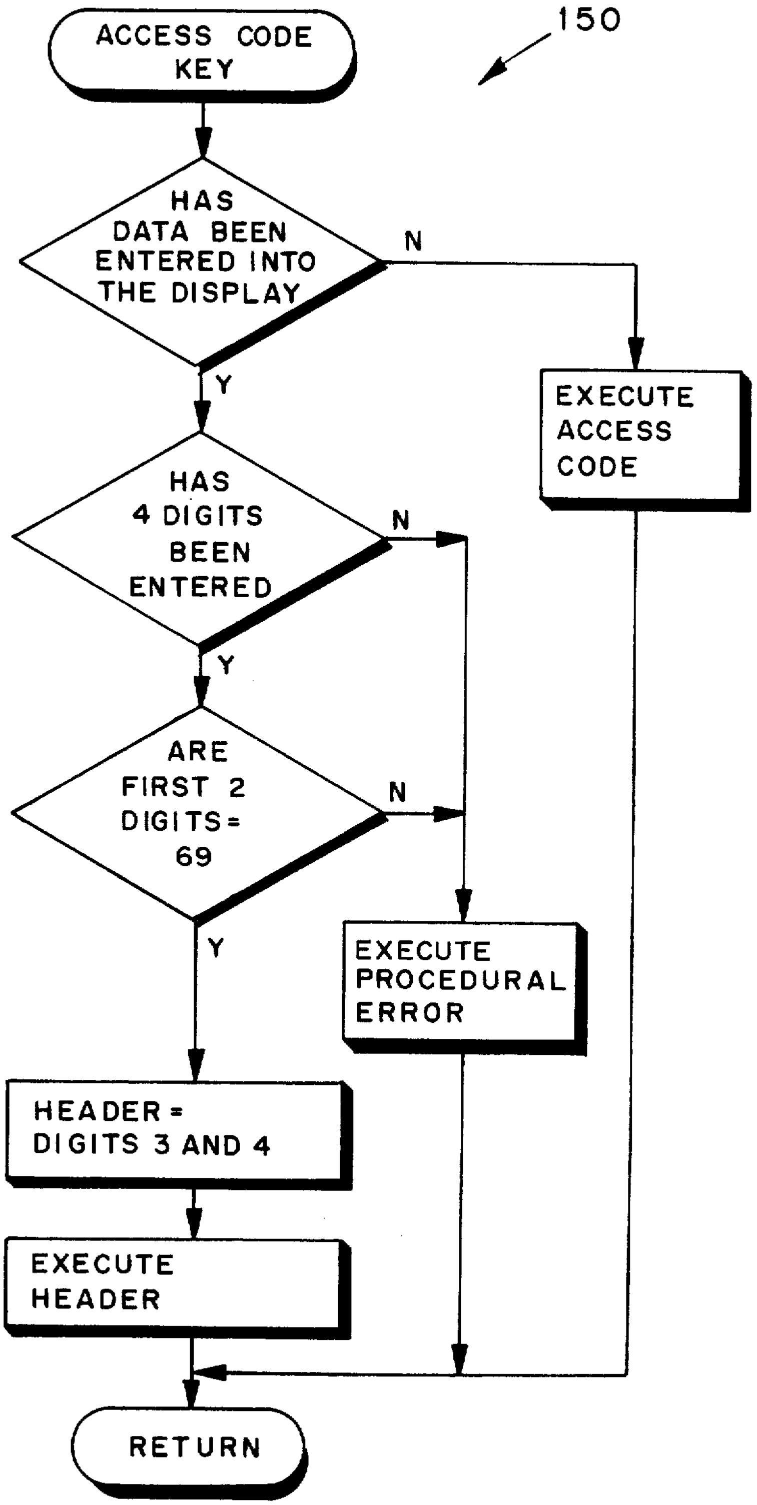
FIG. 5 is a flowchart of a program for displaying the entered data.

Referring to FIG. 5, the flowchart for displaying the entered configuration data is illustrated as 150. The decoding sequence for the one byte message to accomplish the display is illustrated in the flowchart. The access code key 128 from the keyboard 22 or external device 136 is depressed after entering a two byte, four digit, message. The display routine first checks to determine if data has been entered into the display. If not, the access code is executed and control is returned to the superordinate process. If data has been entered into the display, the data is checked to determine if it includes four digits. If not, a procedural error is executed and control is returned to the superordinate process. If, for example, 4 digits have been entered, with the first two digits equal to 69 or some other unique number, the first two digits are checked to determine if they equal 69. If not, a procedural error is executed. If four digits have been entered, the header is equal to digits 3 and 4. The header is then executed and control is returned to the superordinate process. For example, the unique digits chosen for entry can advantageously be chosen to correspond with digits which are not commonly entered via the keyboard 22, such as two digits with a prefix of padding digits. The display routine may be utilized to verify that the proper digits have been entered. Additional details regarding information display can be found in the aforementioned copending patent application entitled POSTAGE METER WITH KEYBOARD KEYS FOR CAUSING DISPLAY OF DATA PERTAINING TO METER OPERATION.

It is known and understood for the purpose of the present application that the term postage meter refers to the general class of devices for the imprinting of a defined unit value for governmental or private carrier delivery of parcels, envelopes or other like application for unit value printing. Thus, although the term postage meter is utilized, it is both known and employed in the trade as a general term for devices utilized in conjunction with services other than those exclusively employed by governmental postage and tax services. For example private, parcel and freight services purchase and employ such meters as a means to provide unit value printing and accounting for individual parcels.

It should be apparent to those skilled in the art that various modifications may be made in the present invention without departing from the spirit and scope thereof as described in the specification and defined in the appended claims.

What is claimed is:

1. A method for customizing the firmware of an electronic postage meter after assembly, comprising the steps of:

storing a configuration program within the electronic postage meter which is capable of configuring the meter operation in response to configuration input messages entered therein;

storing operating programs within the electronic postage meter;

inputting input configuration messages into the electronic postage meter to select desired meter functions and provide input data for use with the operating programs stored in the meter; and storing the input configuration data in the assembled meter under control of the configuration program for subsequent interaction with the operating programs of the meter to customize the meter operation to provide predetermined meter functions.

2. The method recited in claim 1, including the step of:

precluding further access to the configuration program and the storage of further input configuration data in the meter prior to placing the meter in service.

3. The method recited in claim 1, including the step of:

providing an external channel for inputting the input configuration messages into the meter.

4. The method recited in claim 1, including the step of:

providing a keyboard for inputting the input configuration messages into the meter.

5. The method recited in claim 1, wherein:

the input configuration messages are stored in a nonvolatile memory.

6. The method recited in claim 1 wherein:

the configuration program is stored in ROM.

7. The method recited in claim 1, wherein:

an input configuration message presets the ascending register.

8. The method recited in claim 1, wherein:

an input configuration message sets the number of settable banks.

9. The method recited in claim 1, wherein:

an input configuration message sets the number of decimal places.

10. The method recited in claim 1, wherein:

an input configuration message sets the number of phantom zeros.

11. The method recited in claim 1, wherein:

an input configuration message sets the type of meter.

12. The method recited in claim 1, wherein:

an input configuration message sets the meter for special requirements.

13. The method recited in claim 1, wherein:

an input configuration message sets a lock out value for an ascending register.

14. The method recited in claim 1, wherein:

an input configuration message sets the minimum decimal to be displayed.

15. The method recited in claim 1, wherein:

an input configuration message provides external trip capability.

16. The method recited in claim 1, wherein:

an input configuration message sets a procedural error.

17. The method recited in claim 1, including the steps of:

inputting a lock out message into the meter after all of the data for establishing the meter configuration has been inputted therein;

preventing further access to the configuration program which establishes meter customization in response to the lock out message and therefore the storage of any further input configuration messages in the meter.

18. The method recited in claim 1, wherein:

in input configuration messages are stored in non-volatile memory;

the configuration program is stored in ROM.

19. A method for customizing the firmware of an electronic postage meter after assembly, comprising the steps of:

storing a configuration code in a ROM in the meter to configure the meter in response to input configuration messages entered therein;

storing operating programs in the ROM of the electronic postage meter;

inputting configuration messages into the meter for use with the operating programs stored in the meter;

storing the input configuration messages in a non-volatile memory under control of the configuration code for interaction with the operating programs of the meter to customize the meter to provide predetermined meter functions during meter operation; and inputting a lock out message into the meter after all the input configuration messages have been entered into the non-volatile memory to prevent further access to the configuration code.

20. The method recited in claim 19, including the step of:

providing an external channel for inputting input configuration messages into the meter.

21. The method recited in claim 9, including the step of:

inputting input configuration messages into the meter through a keyboard for the meter.

22. Apparatus for customizing the firmware of an electronic postage meter after assembly, comprising:

means for storing operating programs for the meter and a meter configuration program;

non-volatile memory means capable of storing input configuration messages therein under control of the meter configuration program;

means for inputting input configuration messages in the meter;

means operating under control of the meter configuration program for storing the input configuration messages in predetermined addresses of said non-volatile memory; and said stored input configuration messages in said non-volatile memory means interacting with the operating programs of the meter to customize the meter to provide predetermined meter functions during meter operation.

23. The apparatus recited in claim 22, including:

means for inputting a special instruction into the meter after all the input configuration messages have been entered in said non-volatile memory means to prevent further access to the meter configuration proqram and therefore any further entry of input configuration messages in said non-volatile memory means.

24. The apparatus recited in claim 23, wherein:

said means for inputting a special instruction into the meter is activated prior to placing the meter in service.

25. The apparatus recited in claim 22, wherein:

said means for inputting input configuration messages includes an external channel.

26. The apparatus recited in claim 22, wherein:

said means for inputting input configuration messages includes a keyboard.

27. The apparatus recited in claim 22, wherein:

said means for storing the operating programs and meter configuration program includes a ROM.

28. The apparatus recited in claim 22, wherein:

the input configuration messages are capable of modifying data already stored in said non-volatile memory means.

29. The apparatus recited in claim 22, wherein:

the input configuration messages stored in said non-volatile memory means preset an ascending register of the meter.

30. The apparatus recited in claim 22, wherein:

the input configuration messages stored in said non-volatile memory means set the number of settable banks in the meter.

31. The apparatus recited in claim 22 wherein:

the input configuration messages stored in said non-volatile memory means set the number of decimal places.

32. The apparatus recited in claim 22, wherein:

the input configuration messages stored in said non-volatile memory means set the number of phantom zeros.

33. The apparatus recited in claim 22, wherein:

the input configuration messages stored in said non-volatile memory means set the type of meter.

34. The apparatus recited in claim 22, wherein:

the input configuration messages stored in said non-volatile memory means set the meter for special requirements.

35. The apparatus recited in claim 22, wherein:

the input configuration messages stored in said non-volatile memory means set a lock out value for an ascending register in the meter.

36. The apparatus recited in claim 22, wherein:

the input configuration messages stored in said non-volatile memory means set the minimum decimal to be displayed.

37. The apparatus recited in claim 22, wherein:

the input configuration messages stored in said non-volatile memory means provide an external trip capability.

38. The apparatus recited in claim 22, wherein:

the input configuration messages set a procedural error.

39. Apparatus for customizing the firmware of an electronic postage meter after assembly, comprising:

ROM means for storing an operating code for the meter and a meter configuration code;

non-volatile memory means capable of storing input configuration messages therein in accordance with the meter configuration code;

means for inputting input configuration messages into the meter;

means operating under control of the meter configuration code for storing the input configuration messages in predetermined addresses of said non-volatile memory means;

said stored input configuration messages in said non-volatile memory means interacting with the operating code of the meter to customize the meter to provide predetermined meter functions during meter operation; and means for inputting a lock out code into the meter after all the input configuration messages have been entered into said non-volatile memory means and prior to placing the meter in service to prevent further access to the meter configuration code and therefore any further entry of input configuration messages in said non-volatile memory means.

40. The apparatus recited in claim 39, wherein: said means for inputting configuration messages includes an external channel.

41. The apparatus recited in claim 39, wherein: said means for inputting configuration messages includes a keyboard.

* * * * *